United States Patent
Uprit

(10) Patent No.: US 12,260,001 B2
(45) Date of Patent: Mar. 25, 2025

(54) DISTRIBUTED LEDGER NETWORK FOR DATA PORTABILITY

(71) Applicant: Bank of America Corporation, Charlotte, NC (US)

(72) Inventor: Saurabh Uprit, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 290 days.

(21) Appl. No.: 17/723,177

(22) Filed: Apr. 18, 2022

(65) Prior Publication Data

US 2023/0334175 A1 Oct. 19, 2023

(51) Int. Cl.
| | |
|---|---|
| G06F 21/00 | (2013.01) |
| G06F 16/22 | (2019.01) |
| G06F 21/60 | (2013.01) |
| G06F 21/62 | (2013.01) |
| G06F 21/64 | (2013.01) |
| H04L 9/00 | (2022.01) |

(52) U.S. Cl.
CPC ...... *G06F 21/6254* (2013.01); *G06F 16/2255* (2019.01); *G06F 21/602* (2013.01); *G06F 21/606* (2013.01); *G06F 21/64* (2013.01); *H04L 9/50* (2022.05)

(58) Field of Classification Search
CPC .. G06F 16/2255; G06F 21/602; G06F 21/606; G06F 21/6254
See application file for complete search history.

(56) References Cited

U.S. PATENT DOCUMENTS

| | | | |
|---|---|---|---|
| 10,387,895 B2 | 8/2019 | Robeen | |
| 2019/0102837 A1 | 4/2019 | Smith et al. | |
| 2020/0250719 A1 | 8/2020 | Shah | |
| 2023/0259921 A1* | 8/2023 | Kalaboukis | G06Q 20/223 705/42 |
| 2024/0112161 A1* | 4/2024 | Rand | H04L 9/50 |

* cited by examiner

*Primary Examiner* — Rodman Alexander Mahmoudi
(74) *Attorney, Agent, or Firm* — Banner & Witcoff, Ltd.

(57) ABSTRACT

A system for processing an account transfer between two banking infrastructures are described. The system may comprise a plurality of computing nodes. Each of the computing nodes may be associated with a corresponding source chain. The source chains may in combination store a distributed hash table with account information for clients associated with multiple computing nodes. The system may enable communication between the different computing nodes, either directly or indirectly, to process transfer of information.

20 Claims, 4 Drawing Sheets

DISTRIBUTED LEDGER NETWORK FOR DATA PORTABILITY

FIELD

Aspects described herein generally relate to a distributed ledger network and more specifically to application of the distributed ledger network for banking processes.

BACKGROUND

Many banking and financial organizations provide brokerage account services that may be used by clients to perform financial transactions and trades (e.g., in assets, such as stocks, mutual funds, insurance assets, monetary assets, etc.). These services are generally provided in the form of an online portal/account management system that may accessed by the client to initiate transactions/trades of assets, review assets, etc. Often, a client may wish to transfer their account, as being managed by a brokerage firm, to another firm. Transferring an account comprises transfer of asset information between two brokerage firms.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of this disclosure provide effective, efficient, scalable, and convenient technical solutions that address various issues associated with transferring account information across platforms corresponding to different financial organizations offering brokerage services. One or more aspects relate to use of a distributed ledger system for seamlessly integrating computing nodes/systems corresponding to different financial organizations.

In accordance with one or more arrangements, a system for processing account transfers using a distributed hash table (DHT). The system may comprise a plurality of computing nodes forming a peer-to-peer network storing the DHT in respective source chains. The plurality of computing nodes may comprise a first computing node associated with a first firm requesting an account transfer; a second computing node associated with a second firm; a third computing node storing, in an associated database, documents associated with accounts recorded in the plurality of computing nodes; and a fourth computing node for processing a transfer of asset information between different computing nodes in the plurality of computing nodes. The first computing node may receive a request for transfer of account data to a database associated with the first computing node. The account data may comprise: asset information corresponding to an account associated with the second computing node; and documents associated with the account. The first computing node may send, to the fourth computing node a request for transfer of the asset information corresponding to the account. The fourth computing node may communicate with the second computing node to determine the asset information. The first computing node may receive, from the fourth computing node, the asset information, and send, to the third computing node, a request for the documents associated with the account. The first computing node may receive, from the third computing node, the documents associated with the account. Then, the first computing node may generate and add one or more entries to a source chain of the first computing node, wherein the one or more entries comprise the asset information and the documents. The first computing node may send to a subset of the plurality of computing nodes, for storage in respective source chains of the subset and for validation of the one or more entries, at least a portion of the one or more entries.

In some arrangements, the receiving the asset information and the documents may comprise validating, using one or more of the plurality of computing nodes, the asset information and the documents In some arrangements, the one or more entries further may comprise indicators indicating that the documents and asset information are associated with the first computing node.

In some arrangements, the first computing node may generate headers associated with the one or more entries. The headers may comprise a hashed value of information to be stored in the one or more entries and a hash value of an immediately preceding entry in the source chain. The first computing node may send at least a portion of the one or more entries to a subset of the plurality of computing nodes.

In some arrangements, the sending the at least the portion of the one or more entries may comprise sending only headers of entries that comprise private client data. The sending the at least the portion of the one or more entries may comprise sending a subset of entries, of the one or more entries, to the third computing node, wherein the subset of entries comprise the documents.

In some arrangements, the plurality of computing nodes may further comprise a security node. The security node may pseudonymize and encrypt any data transfer between other computing nodes of the plurality of computing nodes.

In some arrangements, the documents may indicate one or more of: standing instructions, preferences, user-interface filters, statements, or linked bank accounts. In some arrangements, the asset information may comprise indications of values of assets comprising the asset information.

In some arrangements, the validation of the one or more entries may comprise verifying respective hash values of the one or more entries.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
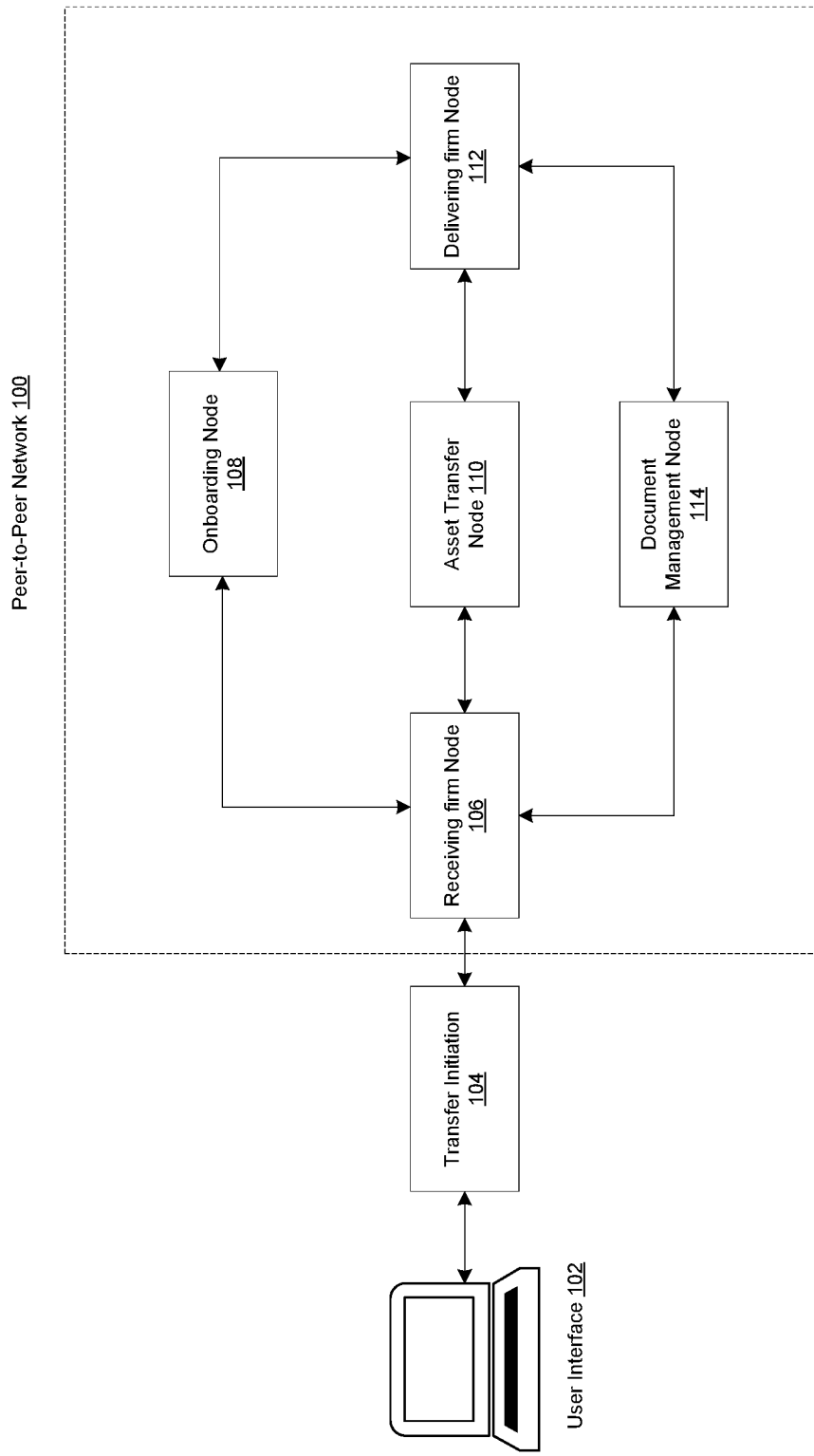
FIG. 1 shows an example architecture for processing a brokerage account transfer from a delivering firm to a receiver firm, in accordance with one or more example arrangements.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Currently, applications and systems are available that may facilitate asset transfer between two brokerage firms. However, the process is not completely automated. As per current protocols, to initiate such a transfer, a receiving brokerage firm (e.g., a brokerage firm to which the account is to be transferred) submits a transfer initiation form (TIF) to an account transfer system to request the transfer. The account transfer system may act as an intermediary between the receiving broker firm and delivering firm (e.g., from which the assets are to be transferred out) and send/receive information from the receive information from both the receive and delivering firms. The system then assigns a control number to the transfer, and distributes output to both the receiving firm and the delivering firm as identified in the TIF, putting the requested transfer into "Request" status. The system may reject the request, for example, if some information is missing from the form, or if the request was submitted in a wrong format.

The delivering firm responds to the request, via the system, either accepting it or rejecting it. After the delivering firm adds the assets that are subject to the transfer, both the receiving and delivering firms have an opportunity to review the list of assets in the account. Once the review period is complete, the system may stage the transfer for settlement, and sets the account to "Settle Prep" status. During this period, which lasts for one business day, the receiving and delivering firms can no longer update the transfer. At this point, the system will issue a settlement report/file to both the delivering and receiving firms to inform them of the assets settling in the transfer. The system further sends the assets to eligible and existing settlement interfaces/standards to process the asset transfer. For examples, different settlement interfaces may apply/be used for different types of assets (e.g., stocks, mutual funds, retirement accounts, etc.). Processing the asset transfer may comprise moving information associated with the assets (e.g., indications of asset value, quantity of shares, types of assets, etc.) from the delivering firm databases to the receiving firm databases.

Many of the processes described above involve require manual oversight and review. Further, such asset transfer systems may be unable to process transfer of other account-related information that may be associated with a brokerage account. For example, the client may have set various standing instructions (e.g., automatic transactions, transfers, purchases, sales, etc.), preferences, filters (e.g., filters relating to funds/stocks to be displayed on their account user interface), mapped banking accounts (e.g., account number corresponding banking accounts linked to the brokerage account), associated with their brokerage account. The brokerage account may be associated with/include various financial statements, forms, documents, etc., (e.g., as provided by the delivering brokerage firm to its clients. The brokerage account may be associated with/include a transaction history that lists prior client activity relating to purchase, sale, and transfer of assets.

Examples herein provide a distributed ledger based system for processing transfer of brokerage account-associated information between account management systems associated with different brokerage firms. The distributed ledger-based system may comprise a plurality of nodes storing brokerage account data in the form of a distributed hash table. A node of the distributed ledger-based system may correspond to a node for processing an asset transfer between the brokerage accounts (e.g., and may correspond to legacy systems used for asset transfers). Another node may be a stored document management node that may be used to store brokerage account-associated information. A node associated with a receiving firm may pull the brokerage account-associated information from the stored document management node. The distributed-ledger based system may enable each node to use its internal copy of application for data generation and storage, while also enabling seamless exchange of generated data across all nodes. The distributed nature of the data storage may enhance data security.

FIG. 1 shows an example architecture for processing a brokerage account transfer from a delivering firm to a receiver firm. The example architecture may comprise a plurality of nodes in a peer-to-peer (P2P) network 100 storing a distributed ledger in the form of a distributed hash table (DHT). The P2P network 100 may comprise a plurality of nodes—nodes associated with various brokerage firms associated with the P2P network 100 (e.g., receiving firm node 106, delivering firm node 112), an asset transfer node 110 (e.g., associated with legacy asset transfer system for account transfer), a document management node 114, and onboarding/third party nodes 108.

To initiate 104 an account transfer, a user interface (e.g., associated with the receiver firm node 106) may be used to submit a transfer request (e.g., via a TIF). The TIF may indicate a source account associated with the delivering firm node 112) and a destination account associated with the receiving firm node 106. The asset transfer node 110 may pull up asset information from the delivering firm node 106 and send the asset information to the receiving firm node 106. Both the receiving firm node 106 and the delivering firm node 112 may run an internal copy of an application for generating and storing brokerage account related data (e.g., asset and account-related information associated with the client).

Any account-related information (e.g., standing instructions, preferences, filters, statements, associated documents, linked bank accounts, etc.) as available at the delivering firm node 112 may be shared to the document management node 114 for future retrieval by other nodes. Based on the transfer request, this information may be pulled by the receiving firm node 106 from the document management node 114. An onboarding node 108 may be used to facilitate addition of new nodes to the distributed ledger network. For example, nodes associated with brokerage firms requesting addition may communicate with the onboarding node 108 and retrieve a portion of the DHT for storage in a local source chain.

Further to above nodes, one or more additional security nodes may be used in the P2P network 100. Any communications between two or more nodes in the P2P network 100 may be via a security node which may pseudonymize and encrypt any data within the communication. This may ensure an additional layer of security for communications within the P2P network. Further the security nodes may maintain/store an audit trail of all communication activity within the network. The audit trail may include a sending node and receiving node for a communication, a time/date of the communication, a size of the communication (e.g., kilobytes, megabytes, etc.). The audit trail may be used to review communication activity within the network and track any suspicious communications between two nodes (e.g., communication that is attempting to bypass any validation by other nodes in the P2P network 100).

Brokerage account data (e.g., asset and account-related information associated with the client) at a brokerage firm node may be stored in the source chain associated with the node. Data added to the source chain may stay within a corresponding source chain, but its header may be shared across other nodes in the network. In this manner, the distributed ledger network holds a distributed database of all public data in a distributed hash table (DHT). Each node holds a small shard of the DHT, so the burden of participation isn't painful for any one node. The DHT, in effect, is a hash chain, with node holding a small portion of the hash chain.

Each node is assigned its own DHT address, based on its public key. Each piece of data also gets its own DHT address, based on its hash. These addresses are just huge numbers, so they can be compared to each other. And because they're derived directly from the data they represent, they can't be forged or chosen at will.

A node looks in its own list of peers and compares their addresses against the data's address. The node sends their publish or query message to a few of the top candidate nodes. If any of those candidates are authorities for that address, they respond with a confirmation of storage (for publishing) or the requested data (for a query).

For example, when a node (e.g., a receiving node) receives data (e.g., asset information from a delivering firm node, or account-related information from a document management node), the node adds the data to its local source chain. The source chain may be a hash chain with multiple entries, each entry comprising a header and a body. The header of the entry may be a hash value generated based on a hash value of a prior entry in the source chain and the body of the entry (e.g., information included within the entry). Addition of the data to a local source chain may comprise generating one or more entries and adding the one or more entries to the local source chain.

The node may share at least a portion of the entry to a random subset of other nodes. If the entry is a public entry, the node may share the entry with the subset of the other nodes. If the entry is not a public entry, it may only share a header of the entry with the subset of other nodes. The subset of other nodes may verify the header to validate the entry. If the node is not compromised, the subset of other nodes may verify and determine that the entry is a valid entry. If the node is compromised, the subset of other nodes may be unable to verify the entry and determine that the entry is an invalid entry. Furthermore, the subset of other nodes may exclude the node from the network. The DHT across all nodes comprises entries in respective source chains at each of the nodes. However, each of the nodes may determine which of the entries are to be shared with other nodes, and which entries to be kept private. This ensures data security of private entries by preventing distribution of such entries across multiple nodes. Simultaneously, the system also enables validation of peer nodes by other nodes in the network reducing probability of an unauthorized system gaining access to the network.

Figure 2:
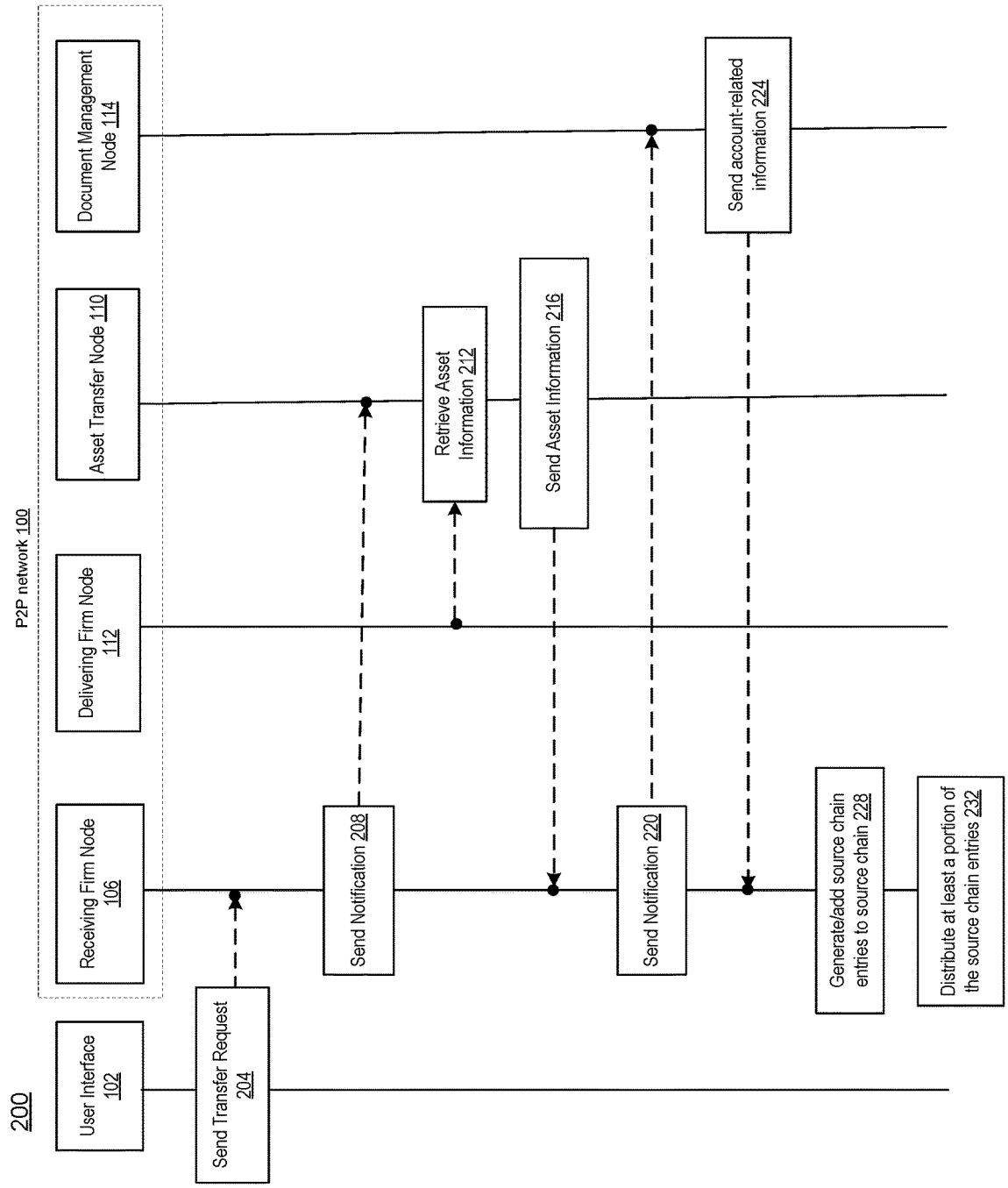
FIG. 2 shows an example event sequence for processing a brokerage account transfer via a P2P network, in accordance with one or more example arrangements.

FIG. 2 shows an example event sequence 200 for processing a brokerage account transfer via a P2P network. The P2P network 100 may comprise a plurality of computing nodes (e.g., as described with respect to FIG. 1). The plurality of computing nodes may each be associated with a respective source chain comprising a plurality of entries. The source chains at the respective computing nodes combine to form the DHT storing brokerage account data for a plurality of firms associated with the P2P network 100.

At step 204, a user (e.g., associated with a brokerage firm to which the brokerage account is to be transferred) may send a transfer request via the user interface 102. The user interface 102 may be a software interface (e.g., a graphical user interface (GUI)) that may be used to submit relevant information for a client associated with the brokerage account. The relevant information may comprise client identifying information (e.g., name, documentation proving identity, documentation proving client's approval of transfer, etc.) and account information (e.g., account number of client at delivering firm, account number of client at receiving firm, delivering firm identifier, receiving firm identifier, etc.). This information may be provided via a TIF. The user interface 102 may be provided via an enterprise computing device associated with the receiving firm node 106. The transfer request may be received at a platform associated with the receiving firm node 106.

At step 208, the receiving firm node 106 may send a notification to the asset transfer node 110. The notification may comprise a TIF that includes information submitted via the user interface 102. The notification may request asset information from the delivering firm node 112.

At step 212, the asset transfer node 110 may retrieve asset information from the delivering firm node. The asset information may comprise, for example, indications of asset value, quantity of shares, types of assets, and/or the like. The asset information may be retrieved from entries in a source chain at the delivering firm node 112. For example, the asset transfer node 110 may send a request for the asset information to the delivering firm node 112. The request may include information submitted in the TIF. The delivering firm node may authenticate/approve the asset information transfer based on reviewing/confirming the request. At step 216, the asset transfer node 110 may send the asset information to the receiving firm node.

At step 220, the receiving firm node 106 may send a notification to the document management node 114. The notification may comprise at least a portion of information included in the TIF submitted via the user interface 102. The notification may request other account-related information, associated with the brokerage account, from the document management node 114. The document management node 114 may be a different and separate node form the delivering firm node.

At step 224, and based on receiving the notification, the document management node may send any account-related information/documents (e.g., linked account information, standing instructions, preferences, filters, statements, associated documents, etc.) associated with the brokerage account to the receiving firm node 106. For example, the account-related information may be stored in a source chain associated with the document management node, and sending the account-related information may comprise retrieving the information from entries in the source chain and sending documents (included within the entries) to the receiving firm node 106.

In an arrangement, the notification sent at step 220 may comprise one or more indicators of types of account related information/documents request by the receiving firm node 106. For example, the receiving firm node 106 may not require information relating to client preferences at the delivering firm. The notification may accordingly indicate that receiving firm node 106 needs linked account information, standing instructions, and statements from the document management node 114 and does need preferences from the delivering firm.

At step 228, the receiving firm node 228 may generate one or more entries comprising the asset information and account-related information and add the one or more entries to its local source chain. Generating the one or more entries may comprise generating a hash value based on the contents of the entry and a hash value of the previous entry. The receiving firm node 228 may also validate the received asset information and account related information with other nodes in the P2P network 100. For example, the receiving firm node 228 may send the account information and asset information to one or more other nodes for verification. The one or more other nodes may compare the received information with information stored in respective local source chains. If there is a mismatch, the one or more other nodes may send a notification to the receiving firm node 106. Generating the one or more entries may comprise adding an indicator of the receiving firm node 106 to the one or more entries.

At step 232, the receiving firm node 106 may distribute at least a portion of the source chain entries to a subset of nodes (but not all nodes) of the P2P network 100. For distribution purposes it may categorize entries as "private" and "public." For entries marked public, the entirety of the entries may be sent to one or more other nodes in the P2P network. For entries marked private, only the headers may be sent to the one or more other nodes. Sending the source chain entries to the subset of other nodes may enable the other nodes to verify the hash values in the entries and validate the entries in accordance with known distributed hash chain procedures. Verifying the hash values comprises generating the hash values based on the contents of the entry, and comparing the generated hash value with the hash value as received in the entry. At the same time, entries not being sent to all nodes enables decentralization by not allowing any single node to have all data in the DHT as stored by the P2P network.

Account-related information now stored at the receiving firm node 106 (including any new generated account-related information) may also be sent to the document management node 114. For example, source chain entries corresponding to the account-related information, at the receiving firm node 106, may be sent to the document management node 114 for later retrieval if needed. The entries may comprise an indication of the receiving firm node 106. Based on this indication, the document management know may determine that the brokerage account is now associated with the receiving firm.

As explained with respect to FIG. 1, transfer of data between any nodes may be pseudonymized and encrypted by a security node. As such, any data transfer between two nodes may be via the security node which may pseudonymize and encrypt the data. In an arrangement homomorphic encryption/decryption may used at the nodes for sending/receiving data.

Figure 3A:
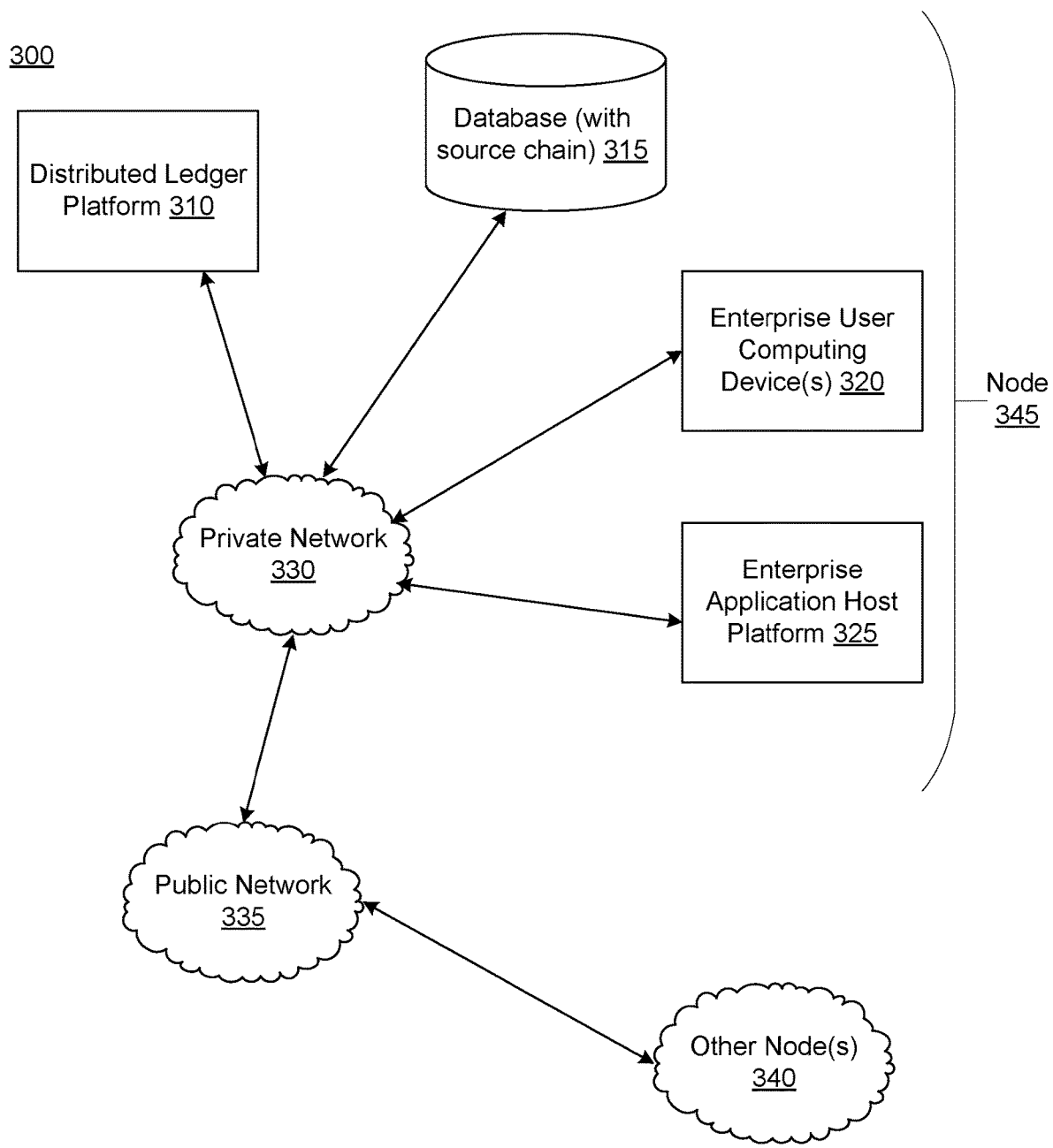
FIG. 3A shows an illustrative computing environment for networking different brokerage services provider networks, in accordance with one or more arrangements.

FIG. 3A shows an illustrative computing environment 300 for networking different brokerage services provider networks (nodes), in accordance with one or more arrangements. The different nodes may together maintain a distributed ledger (e.g., DHT). The computing environment 300 may comprise one or more devices (e.g., computer systems, communication devices, and the like). The one or more devices may be connected via one or networks (e.g., a private network 330 and/or a public network 335). For example, the private network 330 may be associated with a financial organization providing brokerage account services to its clients. The computing environment 300 may comprise, for example, a distributed ledger platform 310, a database 315, one or more enterprise user computing device(s) 320, and/or an enterprise application host platform 325 connected via the private network 330. The devices within private network 330 (or a subset of the devices) may correspond to a node 245 of the distributed ledger network (e.g., the P2P network 100). The node may connect to other nodes 340 via a public network 335. The other nodes 340 may have an architecture substantially similar to that the node 340. The node 345 and the other nodes 340 may correspond to nodes as described with P2P network 100 of FIG. 1.

The devices in the computing environment 300 may transmit/exchange/share information via hardware and/or software interfaces using one or more communication protocols over the private network 330 and/or the public network 335. The communication protocols may be any wired communication protocol(s), wireless communication protocol(s), one or more protocols corresponding to one or more layers in the Open Systems Interconnection (OSI) model (e.g., local area network (LAN) protocol, an Institution of Electrical and Electronics Engineers (IEEE) 802.11 WIFI protocol, a $3^{rd}$ Generation Partnership Project (3GPP) cellular protocol, a hypertext transfer protocol (HTTP), and/or the like).

The distributed ledger platform 310 may comprise one or more computing devices and/or other computer components (e.g., processors, memories, communication interfaces) configured to perform one or more functions as described herein. Further details associated with the architecture of the distributed ledger platform 310 are described with reference to FIG. 3B.

The database 315 may store a source chain associated with a corresponding node (in this case, node 345). The database 3615 may comprise one or more servers or other computing devices that may be associated with computer storage media. Computer storage media include, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by the other devices in the computing environment 300.

The enterprise application host platform 325 may comprise one or more computing devices and/or other computer components (e.g., processors, memories, communication interfaces). In addition, the enterprise application host platform 325 may be configured to host, execute, and/or otherwise provide one or more services/applications for the node 345. For example, if the private network is associated with a brokerage services provider, the enterprise application host platform 325 may be configured to host, execute, and/or otherwise provide one or more applications for account management services as provided to the clients. As another example, if the computing environment 300 is associated with a document management node, the enterprise application host platform 325 may be configured to host, execute, and/or otherwise provide one or more programs for receiving, storing and providing documents and other information from/to delivering node/receiving nodes. The above are merely exemplary use-cases for the computing environment 300, and one of skill in the art may easily envision other scenarios where the computing environment 300 may be utilized to provide and support end-user applications.

The enterprise user computing device(s) 320 may be personal computing devices (e.g., desktop computers, laptop computers) or mobile computing devices (e.g., smartphones, tablets). In addition, the enterprise user computing device(s) 320 may be linked to and/or operated by specific enterprise users (who may, for example, be employees or other affiliates of the enterprise organization). An authorized user may use an enterprise user computing device 320 to initiate a brokerage account transfer.

In one or more arrangements, the distributed ledger platform 310, the database 315, the enterprise user computing device(s) 320, the enterprise application host platform 325, and/or the other devices/systems in the computing environment 300 may be any type of computing device capable of receiving input via a user interface, and communicating the received input to one or more other computing devices in the computing environment 300. For example, the distributed ledger platform 310, the database 315, the enterprise user computing device(s) 320, the enterprise application host platform 325, and/or the other devices/systems in the computing environment 300 may, in some instances, be and/or include server computers, desktop computers, laptop computers, tablet computers, smart phones, or the like that may comprised of one or more processors, memories, communication interfaces, storage devices, and/or other components. Any and/or all of the distributed ledger platform 310, the database 315, the enterprise user computing device(s) 320, the enterprise application host platform 325, and/or the other devices/systems in the computing environment 300 may, in some instances, be and/or comprise special-purpose computing devices configured to perform specific functions.

Figure 3B:
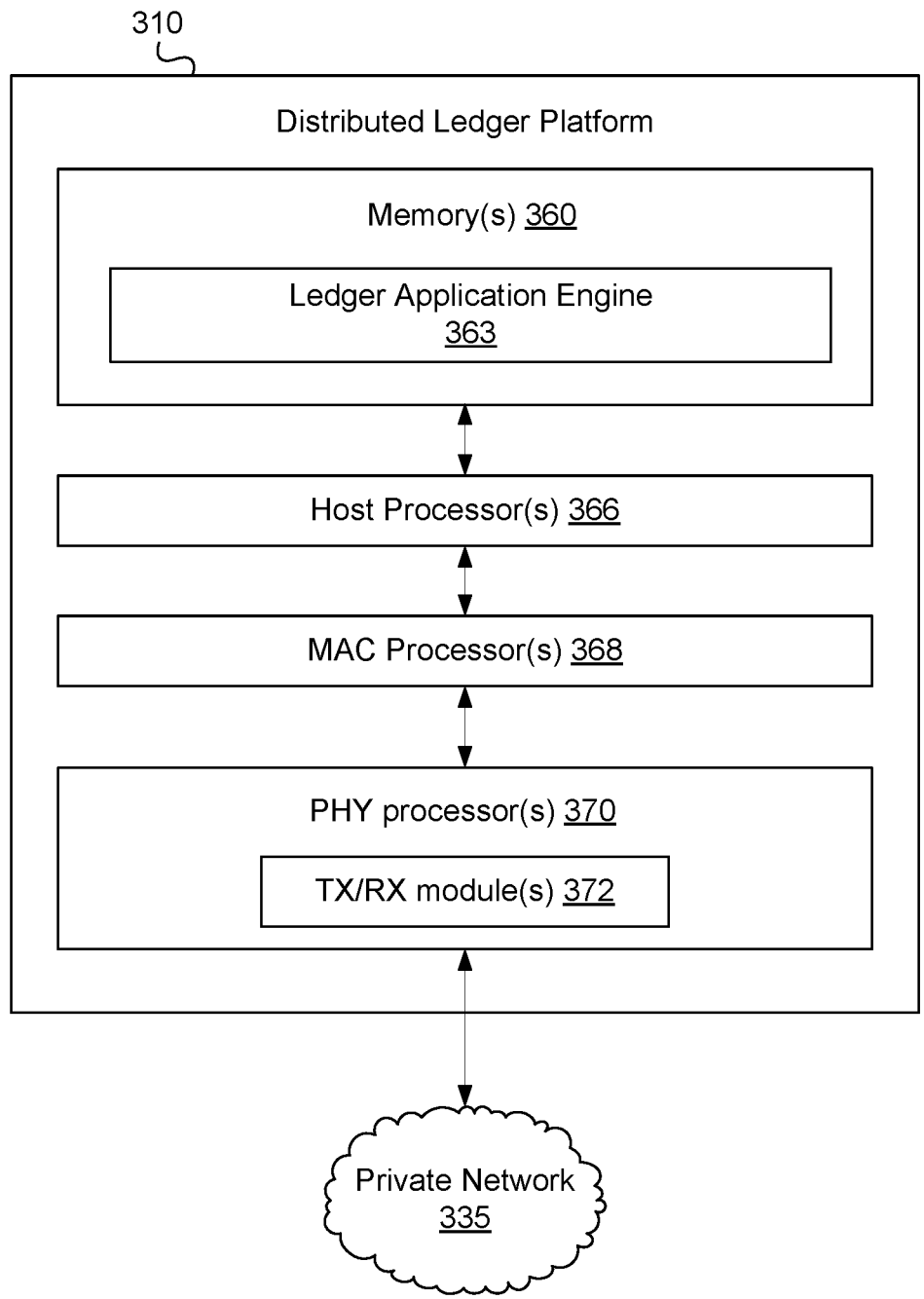
FIG. 3B shows an example distributed ledger platform, in accordance with one or more examples described herein, in accordance with one or more arrangements.

FIG. 3B shows an example distributed ledger platform 310, in accordance with one or more examples described herein. The distributed ledger platform 310 may comprise one or more of host processor(s) 366, medium access control (MAC) processor(s) 368, physical layer (PHY) processor(s) 370, transmit/receive (TX/RX) module(s) 372, memory 360, and/or the like. One or more data buses may interconnect host processor(s) 366, MAC processor(s) 368, PHY processor(s) 370, and/or Tx/Rx module(s) 372, and/or memory 360. The distributed ledger platform 310 may be implemented using one or more integrated circuits (ICs), software, or a combination thereof, configured to operate as discussed below. The host processor(s) 366, the MAC processor(s) 368, and the PHY processor(s) 370 may be implemented, at least partially, on a single IC or multiple ICs. Memory 360 may be any memory such as a random-access memory (RAM), a read-only memory (ROM), a flash memory, or any other electronically readable memory, or the like.

Messages transmitted from and received at devices in the computing environment 300 may be encoded in one or more MAC data units and/or PHY data units. The MAC processor(s) 368 and/or the PHY processor(s) 370 of the distributed ledger platform 310 may be configured to generate data units, and process received data units, that conform to any suitable wired and/or wireless communication protocol. For example, the MAC processor(s) 368 may be configured to implement MAC layer functions, and the PHY processor(s) 370 may be configured to implement PHY layer functions corresponding to the communication protocol. The MAC processor(s) 368 may, for example, generate MAC data units (e.g., MAC protocol data units (MPDUs)), and forward the MAC data units to the PHY processor(s) 370. The PHY processor(s) 370 may, for example, generate PHY data units (e.g., PHY protocol data units (PPDUs)) based on the MAC data units. The generated PHY data units may be transmitted via the TX/RX module(s) 372 over the private network 330. Similarly, the PHY processor(s) 370 may receive PHY data units from the TX/RX module(s) 372, extract MAC data units encapsulated within the PHY data units, and forward the extracted MAC data units to the MAC processor(s). The MAC processor(s) 368 may then process the MAC data units as forwarded by the PHY processor(s) 370.

One or more processors (e.g., the host processor(s) 366, the MAC processor(s) 368, the PHY processor(s) 370, and/or the like) of the distributed ledger platform 310 may be configured to execute machine readable instructions stored in memory 360. The memory 360 may comprise one or more program modules/engines having instructions that when executed by the one or more processors cause the distributed ledger platform 310 to perform one or more functions described herein. The one or more program modules/engines and/or databases may be stored by and/or maintained in different memory units of the distributed ledger platform 310 and/or by different computing devices that may form and/or otherwise make up the distributed ledger platform 310. For example, the memory 360 may have, store, and/or comprise a ledger application engine 363 to add data to a local source chain of the node and share the data with selected nodes of the distributed ledger network. The ledger application engine 363 may also comprise instructions for sending/receiving messages in accordance with the steps described with respect to FIGS. 1 and 2.

Each node has its own application/associated ledger platforms with corresponding different ledger application engines. However, each of the ledger application engines may still may be to communicate with one another This may enable nodes of different firms to interface with each other, while also having separate applications available for internal processes.

While FIG. 3A illustrates the distributed ledger platform 310, the database 315, the enterprise user computing device(s) 320, the enterprise application host platform 325, as being separate elements connected in the private network 335, in one or more other arrangements, functions of one or more of the above may be integrated in a single device/network of devices. For example, elements in the distributed ledger platform 310 (e.g., host processor(s) 366, memory(s) 360, MAC processor(s) 368, PHY processor(s) 370, TX/RX module(s) 372, and/or one or more program/modules stored in memory(s) 360) may share hardware and software elements with and corresponding to, for example, the enterprise application host platform 325, and/or the enterprise user devices 320.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally, or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

The invention claimed is:

1. A system for processing account transfers using a distributed hash table (DHT), the system comprising:
   a plurality of computing nodes forming a peer-to-peer network storing the DHT in respective source chains, wherein the plurality of computing nodes comprises:
   a first computing node associated with a first firm requesting an account transfer;
   a second computing node associated with a second firm;
   a third computing node storing, in an associated database, documents associated with accounts recorded in the plurality of computing nodes;
   a fourth computing node for processing a transfer of asset information between different computing nodes in the plurality of computing nodes; and
   wherein the first computing node comprises:
   a processor; and
   memory storing computer-readable instructions that, when executed by the processor, cause the first computing node to:
   receive a request for transfer of account data to a database associated with the first computing node, wherein the account data comprises:
   asset information corresponding to an account associated with the second computing node; and
   documents associated with the account;
   send, to the fourth computing node, a request for transfer of the asset information corresponding to the account, wherein the fourth computing node communicates with the second computing node to determine the asset information;
   receive, from the fourth computing node, the asset information;
   send, to the third computing node, a request for the documents associated with the account;
   receive, from the third computing node, the documents associated with the account;
   generate and add one or more entries to a source chain of the first computing node, wherein the one or more entries comprise the asset information and the documents; and
   send to a subset of the plurality of computing nodes, for storage in respective source chains of the subset and for validation of the one or more entries,
   at least a portion of the one or more entries.

2. The system of claim 1, wherein the receiving the asset information and the documents comprises validating, using one or more of the plurality of computing nodes, the asset information and the documents.

3. The system of claim 1, wherein the one or more entries further comprise indicators that the documents and the asset information are associated with the first computing node.

4. The system of claim 1, wherein the instructions, when executed by the processor, cause the first computing node to:
   generate headers associated with the one or more entries, wherein the headers comprise a hashed value of information to be stored in the one or more entries and a hash value of an immediately preceding entry in the source chain; and
   send at least a portion of the one or more entries to a subset of the plurality of computing nodes.

5. The system of claim 4, wherein the sending the at least the portion of the one or more entries comprises sending only headers of entries that comprise private client data.

6. The system of claim 1, wherein the sending the at least the portion of the one or more entries comprising sending a subset of entries, of the one or more entries, to the third computing node, wherein the subset of entries comprise the documents.

7. The system of claim 1, further comprising a security node, wherein the security node pseudonymizes and encrypts any data transfer between other computing nodes of the plurality of computing nodes.

8. The system of claim 1, wherein the documents indicate one or more of:
   standing instructions,
   preferences, user-interface filters,
statements, or
linked bank accounts.

9. The system of claim 1, wherein the asset information comprises values of assets comprising the asset information.

10. The system of claim 1, wherein the validation of the one or more entries comprises verifying respective hash values of the one or more entries.

11. A method for processing account transfers using a distributed hash table (DHT), wherein a plurality of computing nodes of a peer-to-peer network store the DHT, the method comprising:
receiving, at a first computing node, a request for transfer of account data to a database associated with the first computing node, wherein the first computing node is associated with a first firm requesting an account transfer, wherein the account data comprises:
asset information corresponding to an account associated with a second computing node, wherein the second computing node associated with a second firm; and
documents associated with the account;
sending, to a fourth computing node, a request for transfer of the asset information corresponding to the account, wherein the fourth computing node communicates with the second computing node to determine the asset information;
receiving, from the fourth computing node, the asset information;
sending, to a third computing node, a request for the documents associated with the account;
receiving, from the third computing node, the documents associated with the account;
generating and adding one or more entries to a source chain of the first computing node, wherein the one or more entries comprise the asset information and the documents; and
sending to a subset of the plurality of computing nodes, for storage in respective source chains of the subset and for validation, at least a portion of the one or more entries.

12. The method of claim 11, wherein the receiving the asset information and the documents comprises validating, using one or more of the plurality of computing nodes, the asset information and the documents.

13. The method of claim 11, wherein the one or more entries further comprise indicators that the documents and the asset information are associated with the first computing node.

14. The method of claim 11, further comprising:
generating headers associated with the one or more entries, wherein the headers comprise a hashed value of information to be stored in the one or more entries and a hash value of an immediately preceding entry in the source chain; and
sending at least a portion of the one or more entries to a subset of the plurality of computing nodes.

15. The method of claim 14, wherein the sending the at least the portion of the one or more entries comprises sending only headers of entries that comprise private client data.

16. The method of claim 11, wherein the sending the at least the portion of the one or more entries comprising sending a subset of entries, of the one or more entries, to the third computing node, wherein the subset of entries comprise the documents.

17. The method of claim 11, wherein the plurality of computing nodes comprises a security node, wherein the security node pseudonymizes and encrypts any data transfer between other computing nodes of the plurality of computing nodes.

18. The method of claim 11, wherein the asset information comprises indications of assets comprising the asset information.

19. The method of claim 11, wherein the validation of the one or more entries comprises verifying respective hash values of the one or more entries.

20. A non-transitory computer-readable medium storing computer-executable instructions that, when executed by a computer processor, causes a first computing node to:
receive, at the first computing node, a request for transfer of account data to a database associated with the first computing node, wherein the first computing node is associated with a first firm requesting an account transfer, wherein the account data comprises:
asset information corresponding to an account associated with a second computing node, wherein the second computing node associated with a second firm; and
documents associated with the account;
send, to a fourth computing node, a request for transfer of the asset information corresponding to the account, wherein the fourth computing node communicates with the second computing node to determine the asset information;
receive, from the fourth computing node, the asset information;
send, to a third computing node, a request for the documents associated with the account;
receive, from the third computing node, the documents associated with the account;
generate and adding one or more entries to a source chain of the first computing node, wherein the one or more entries comprise the asset information and the documents; and
send to a subset of a plurality of computing nodes, for storage in respective source chains of the subset and for validation, at least a portion of the one or more entries.

* * * * *